(12) United States Patent
Son

(10) Patent No.: US 8,665,764 B2
(45) Date of Patent: Mar. 4, 2014

(54) APPARATUS AND METHOD FOR CHANGING MULTICAST AND BROADCAST SERVICE CHANNEL OF TERMINAL IN BROADBAND WIRELESS COMMUNICATION SYSTEM

(75) Inventor: Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 12/398,074

(22) Filed: Mar. 4, 2009

(65) Prior Publication Data
US 2009/0225691 A1 Sep. 10, 2009

(30) Foreign Application Priority Data
Mar. 6, 2008 (KR) ........................ 10-2008-0020952

(51) Int. Cl.
*H04H 20/71* (2008.01)
*H04W 72/04* (2009.01)
*H04J 3/26* (2006.01)

(52) U.S. Cl.
USPC ........... 370/312; 370/329; 370/390; 370/432; 370/252; 370/208; 455/450

(58) Field of Classification Search
USPC ............ 370/312, 432, 390, 329, 330, 395.21
See application file for complete search history.

(56) References Cited

U.S. PATENT DOCUMENTS

| | | | |
|---|---|---|---|
| 7,349,403 B2 * | 3/2008 | Lee et al. .................. | 370/395.21 |
| 7,567,528 B2 * | 7/2009 | Naghian et al. ............... | 370/328 |
| 7,697,465 B2 * | 4/2010 | Wu et al. ........................ | 370/312 |
| 8,159,983 B2 * | 4/2012 | Tao et al. ....................... | 370/312 |
| 2005/0249142 A1 * | 11/2005 | Kim et al. ...................... | 370/312 |
| 2006/0222323 A1 | 10/2006 | Sharpe et al. | |
| 2006/0227778 A1 * | 10/2006 | Jin et al. ......................... | 370/389 |
| 2006/0239264 A1 * | 10/2006 | Kang et al. ..................... | 370/390 |
| 2007/0178880 A1 * | 8/2007 | Saito et al. .................... | 455/405 |
| 2007/0189162 A1 | 8/2007 | Song et al. | |
| 2007/0230351 A1 * | 10/2007 | Dang ............................. | 370/236 |
| 2008/0008159 A1 * | 1/2008 | Bourlas et al. ................ | 370/352 |
| 2008/0009283 A1 * | 1/2008 | Lim et al. ................... | 455/432.3 |
| 2008/0056219 A1 * | 3/2008 | Venkatachalam ............. | 370/342 |
| 2008/0285497 A1 * | 11/2008 | Pichna et al. ................. | 370/312 |
| 2009/0154386 A1 * | 6/2009 | So et al. ........................ | 370/311 |

FOREIGN PATENT DOCUMENTS

KR 10-2008-0104518 A 12/2008
WO 2006/115368 A1 11/2006

* cited by examiner

*Primary Examiner* — Candal Elpenord
(74) *Attorney, Agent, or Firm* — Jefferson IP Law, LLP

(57) ABSTRACT

An apparatus and a method for changing a Multicast and Broadcast Service (MBS) channel of a terminal in a broadband wireless communication system are provided. In the method, an overall channel scheduling information message comprising group information for Connection Identifications (CIDs) of all channels in service is received from a base station. Transmission information of an MBS channel scheduling information message corresponding to a group to which a CID of a current channel belongs is extracted from the overall channel scheduling information message. A relevant MBS channel scheduling information message is received from the base station using the extracted transmission information of the MBS channel scheduling information message. Transmission information of an MBS MAP message for a relevant CID is extracted from the MBS channel scheduling information message. Therefore, an MBS channel change of a terminal can be easily performed.

28 Claims, 5 Drawing Sheets

APPARATUS AND METHOD FOR CHANGING MULTICAST AND BROADCAST SERVICE CHANNEL OF TERMINAL IN BROADBAND WIRELESS COMMUNICATION SYSTEM

PRIORITY

This application claims the benefit under 35 U.S.C. §119(a) of a Korean patent application filed in the Korean Intellectual Property Office on Mar. 6, 2008 and assigned Serial No. 10-2008-0020952, the entire disclosure of which is hereby incorporated by reference.

BACKGROUND OF THE INVENTION

1. Field of the Invention

The present invention relates to a Multicast and Broadcast Service (MBS). More particularly, the present invention relates to an apparatus and a method for changing an MBS channel of a terminal in a broadband wireless communication system.

2. Description of the Related Art

In an MBS of a conventional mobile Worldwide Interoperability for Microwave Access (WiMAX) system, one channel is associated with a connection having one service flow, which is discriminated by Connection Identification (referred to as CID hereinafter). When a user requests a change from a channel that is currently being received, a conventional terminal performs a Dynamic Service Add (DSA) procedure with a base station in order to receive information (i.e., CID) regarding a new channel. However, this DSA procedure causes delay while the terminal changes its channel.

In order for a terminal to receive a different channel in an MBS of the conventional mobile WiMAX, the terminal should receive all data from a base station and determine whether information regarding an MBS MAP message is included in a DownLink (DL) MAP of a relevant frame. When the information regarding the MBS MAP message is included in the DL MAP, the terminal receives relevant MBS MAP messages using the information regarding the MBS MAP message, determines whether information regarding the different channel is included in the MBS MAP messages, and receives data via the different channel by changing the channel using the information regarding the different channel. In other words, it is not until a terminal receives the DL MAP from the base station that the terminal is able to receive information regarding the different channel. Therefore, when reception coverage of the DL MAP is smaller than that of the MBS, a terminal may not receive information regarding the different channel to which the terminal intends to change. In other words, information regarding a channel change increases. Accordingly, there is a need for an improved apparatus and method for changing an MBS channel of a terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for changing a Multicast and Broadcast Service (MBS) channel of a terminal in a broadband wireless communication system.

Another aspect of the present invention is to provide an apparatus and a method for transmitting information for channel change to a terminal while conserving reception coverage of an MBS in a broadband wireless communication system.

Still another aspect of the present invention is to provide an apparatus and a method for transmitting scheduling information for each Connection Identifier (CID) to a terminal through a newly defined message rather than a conventional DL MAP in a broadband wireless communication system.

According to an aspect of the present invention, a method for receiving a Multicast and Broadcast Service (MBS) channel of a terminal in a wireless communication system is provided. The method includes receiving an overall channel scheduling information message including group information for Connection Identifications (CIDs) of all channels in service from a base station, extracting transmission information of an MBS channel scheduling information message corresponding to a group to which a CID of a current channel belongs from the overall channel scheduling information message, receiving a relevant MBS channel scheduling information message from the base station using the extracted transmission information of the MBS channel scheduling information message and extracting transmission information of an MBS MAP message for a relevant CID from the MBS channel scheduling information message.

According to another aspect of the present invention, a method for receiving an MBS channel of a terminal in a wireless communication system is provided. The method includes receiving an overall channel scheduling information message including transmission information of an MBS MAP message for CIDs of all channels in service from a base station and extracting transmission information of an MBS MAP message for a CID of a current channel from the overall channel scheduling information message.

According to still another aspect of the present invention, an apparatus for receiving an MBS channel of a terminal in a wireless communication system is provided. The apparatus includes a unit for receiving an overall channel scheduling information message including group information for CIDs of all channels in service from a base station, a unit for extracting transmission information of an MBS channel scheduling information message corresponding to a group to which CID of a current channel belongs from the overall channel scheduling information message, a unit for receiving a relevant MBS channel scheduling information message from the base station using the extracted transmission information of the MBS channel scheduling information message and a unit for extracting transmission information of an MBS MAP message for a relevant CID from the MBS channel scheduling information message.

According to yet another aspect of the present invention, an apparatus for receiving an MBS channel of a terminal in a wireless communication system is provided. The apparatus includes a unit for receiving an overall channel scheduling information message including transmission information of an MBS MAP message for CIDs of all channels in service from a base station and a unit for extracting transmission information of an MBS MAP message for a CID of a current channel from the overall channel scheduling information message.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
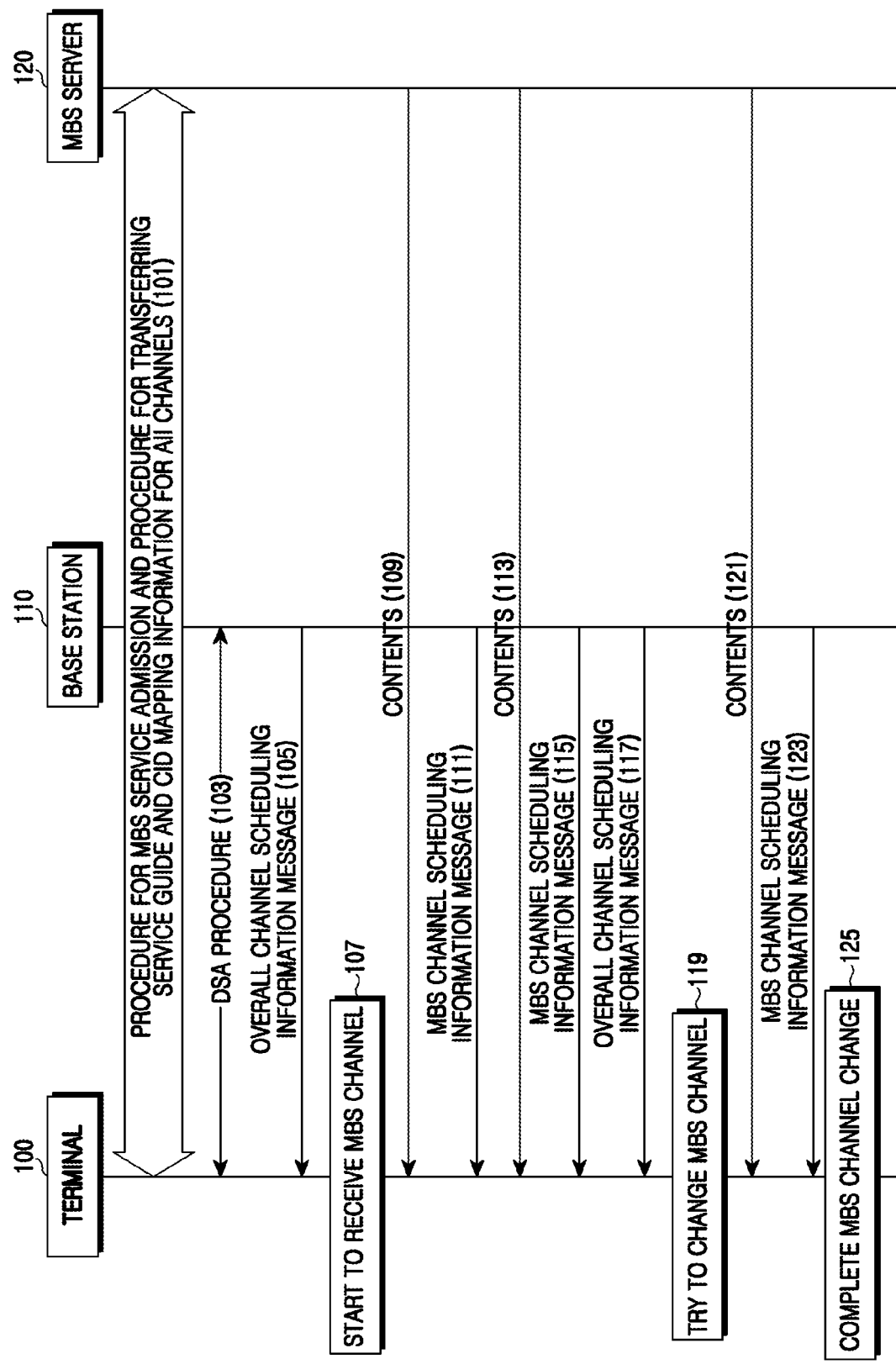
FIG. 1 is a diagram of a signal flow illustrating a method for changing an MBS channel of a terminal in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention will be described herein below with reference to the accompanying drawings. In the following description, well-known functions or constructions are not described in detail since they would obscure the invention in unnecessary detail.

Exemplary embodiments of the present invention provide an apparatus and a method for changing an MBS channel of a terminal in a broadband wireless communication system.

The following description of exemplary embodiments assumes that a terminal receives programming information of a broadcast service and CID mapping information for all channels in the service via an application layer communication with an MBS server. Therefore, a terminal does not need to perform a Dynamic Service Add (DSA)/Dynamic Service Change (DSC)/Dynamic Service Deletion (DSD) procedure with a base station in order to receive a CID of a different channel to which the terminal intends to change. In the description below, the term "CID" denotes an MBS CID.

Exemplary embodiments of the present invention provide a method for transmitting transmission information of an MBS MAP message to a terminal via a newly defined message instead of a conventional DL MAP in a broadband wireless communication system. That is, exemplary embodiments of the present invention provide a method for transmitting scheduling information for each CID to a terminal via a newly defined message. Therefore, a terminal does not need to stand by and check a received DL MAP in order to receive information regarding a new MBS channel when changing an MBS channel.

Here, as a method for transmitting scheduling information for each CID of a base station according to an exemplary embodiment of the present invention, a method of periodically transmitting scheduling information for all IDs to a terminal may be considered. This method can be advantageously applied to a case where there exists a newly entering terminal or scheduling information changes.

As another exemplary method for transmitting scheduling information for each CID, a method of classifying CIDs having similar scheduling information transmission periods into a group, and simultaneously transmitting, to a terminal, scheduling information for CIDs that belong to a relevant group at a relevant transmission period for each group can be considered. For example, if there are a total of four CIDs in a system, CID 1 and CID 2 have a scheduling information transmission period of 200 msec, and CID 3 and CID 4 have a scheduling information transmission period of 800 msec, the CID 1 and CID 2 can be classified into one group, and CID 3 and CID 4 can be classified into the other group. Here, the scheduling information transmission period for each CID can be differently set depending on a channel frequency viewed by a relevant user and depending on whether scheduling information is changed.

For this purpose, an exemplary embodiment of the present invention defines two new messages. A first new message is an overall channel scheduling information message and a second new message is an MBS channel scheduling information message. Here, the method of transmitting scheduling information for each CID group according to the scheduling information transmission period can be realized using both the overall channel scheduling information message and the MBS channel scheduling information message. The method of periodically transmitting scheduling information for all CIDs can be realized using the overall channel scheduling information message.

First, an exemplary method of transmitting scheduling information for each CID group according to the scheduling information transmission period is described. The overall channel scheduling information message includes information regarding classified groups and information regarding CIDs which belong to each group. The MBS channel scheduling information message may include scheduling information for CIDs which belong to a relevant group. In other words, the MBS channel scheduling information message may include scheduling information of MBS data transmitted via CIDs which belong to a relevant group. That is, the MBS channel scheduling information message may include transmission information of MBS MAP messages for CIDs which belong to a relevant group. Also, the overall channel scheduling information message may include transmission information of MBS channel scheduling information messages so that a terminal can receive an MBS channel scheduling information message transmitted from a base station. A terminal can recognize scheduling information for a different CID not included in the same MBS channel scheduling information message through reception of the overall channel scheduling information message even while receiving only scheduling information for a specific CID.

Next, an exemplary method of periodically transmitting scheduling information for CIDs is described. The overall channel scheduling information message may include scheduling information of all MBS data transmitted from a base station. That is, the overall channel scheduling information message may include transmission information of an MBS MAP message for relevant CIDs.

Here, an MBS channel scheduling information message used by an exemplary method of transmitting scheduling information for each CID group according to the scheduling information transmission period can be configured in the form of Table 1.

TABLE 1

| For (n = 1;n < N; n++){ | For sentence regarding N MBS MAP messages |
| --- | --- |
| Start frame offset of MBS MAP message_n | Start frame offset of n-th MBS MAP message |
| Period of MBS MAP message_n | Transmission period of n-th MBS MAP message |
| Location of MBS MAP message_n inside relevant frame | Location of n-th MBS MAP message inside relevant frame |
| Message size of MBS MAP message_n | Size of n-th MBS MAP message |
| Included CIDs | CIDs included in n-th MBS MAP message |
| } | |

Here, Table 1 can be configured in the form of Table 2.

TABLE 2

| For (n = 1; n < N; n++){ | For sentence regarding N CIDs |
| --- | --- |
| CID_n | n-th CID |
| Start frame offset of MBS MAP message for CID_n | Start frame offset of MBS MAP message for n-th CID |
| Period of MBS MAP message for CID_n | Transmission period of MBS MAP message for n-th CID |
| Location of MBS MAP message for CID_n inside relevant frame | Location of MBS MAP message for n-th CID inside relevant frame |
| Message size of MBS MAP message for CID_n | Size of MBS MAP message for n-th CID |
| } | |

Here, an overall channel scheduling information message used by an exemplary method of transmitting scheduling information for each CID group according to the scheduling information transmission period can be configured in the form of Table 3.

TABLE 3

| For (n = 1; n < N; n++){ | For sentence regarding N MBS channel scheduling information messages |
| --- | --- |
| Start frame offset of MBS channel scheduling information_n | Start frame offset of n-th MBS channel scheduling information message |
| Period of MBS channel scheduling information_n | Transmission period of n-th MBS channel scheduling information message |
| Included CIDs | CIDs included in n-th MBS channel scheduling information message |
| Location of MBS channel scheduling information_n inside relevant frame | Location of n-th MBS channel scheduling information message inside relevant frame |
| Message size of MBS channel scheduling information_n | Size of n-th MBS channel scheduling information message |
| } | |

An overall channel scheduling information message used by an exemplary method of periodically transmitting scheduling information for CIDs may be configured in the form of Table 1 or Table 2.

FIG. 1 is a diagram of a signal flow illustrating a method for changing an MBS channel of a terminal in a broadband wireless communication system according to an exemplary embodiment of the present invention. Here, FIG. 1 illustrates a method for receiving, at a terminal, MBS data using a changed CID according to a request for a change in channel by a user in a method of transmitting scheduling information for each CID group according to a scheduling information transmission period.

Referring to FIG. 1, in step 101, a terminal 100 performs an MBS service admission procedure, and performs a procedure of transferring service guide information including programming information of a broadcast service and a CID mapping information for all channels of the service in cooperation with an MBS server 120. By doing so, the terminal 100 can select a user-requested channel using the service guide and the CID mapping information.

In step 103, the terminal 100 establishes an MBS connection for transmitting MBS traffic by performing a DSA procedure with a base station 110. That is, the terminal 100 performs a DSA procedure with the base station 110 in order to receive a CID for a user-requested channel, and the base station 110 assigns a CID for the user-requested channel to the terminal 100. With this procedure, the terminal 100 can decode MBS burst for a relevant channel using the assigned CID.

In step 105, the terminal 100 receives, from the base station, an overall channel scheduling information message including information regarding CID groups classified using a scheduling information transmission period and CIDs which belong to each CID group, and stores overall channel scheduling information included in the message.

In step 107, the terminal 100 starts to receive the user-requested MBS channel, and in step 109, receives an MBS MAP message and MBS contents data of the MBS channel from the MBS server 120 using the received MBS MAP message.

In step 111, the terminal 100 extracts transmission information of an MBS channel scheduling information message for a relevant CID from the overall channel scheduling information, receives the MBS channel scheduling information message for the relevant CID from the base station 110 using the extracted transmission information of the MBS channel scheduling information message, and stores MBS channel scheduling information included in the message.

In step 113, the terminal 100 extracts transmission information of an MBS MAP message for a relevant MBS channel from the MBS channel scheduling information, receives the MBS MAP message using the extracted transmission information of the MBS MAP message, and receives MBS contents data of a relevant MBS channel from the MBS server 120 using the received MBS MAP message.

Similarly, in step 115, the terminal 100 receives an MBS channel scheduling information message for a relevant CID from the base station 110, stores MBS channel scheduling information included in the message, and in step 117, receives an overall channel scheduling information message from the base station 110 and stores overall channel scheduling information included in the message.

In step 119, the terminal 100 may attempt to change an MBS channel in response to an MBS channel change request from a user. In step 121, the terminal 100 receives an MBS MAP message and receives MBS contents data of a relevant MBS channel from the MBS server 120 using the received MBS MAP message with the same method until completion of the MBS channel change. After that, in step 123, the terminal 100 receives an MBS channel scheduling information message for a CID of the MBS channel to which the terminal intends to change, stores MBS channel scheduling information included in the message, extracts transmission information of an MBS MAP message for a relevant MBS channel from the MBS channel scheduling information, receives a relevant MBS MAP message using the transmission information of the MBS MAP message, and receives MBS contents data of a changed MBS channel from the MBS server 120 using the received MBS MAP message. With the above procedure, the terminal 100 completes an MBS channel change in step 125.

Meanwhile, in the method for periodically transmitting scheduling information for all CIDs, since transmission information of an MBS MAP message for CIDs of all channels is included inside the overall channel scheduling information message, the terminal 100 does not need to transmit/receive an MBS channel scheduling information message in order to receive and change an MBS channel in FIG. 1. That is, the terminal extracts transmission information of an MBS MAP message for a CID of a current channel from the overall channel scheduling information message. Thus, even when a change to a new CID is requested according to a channel change, the terminal may extract transmission information of an MBS MAP message for a new CID from the overall channel scheduling information message in order to receive an MBS channel.

Meanwhile, the base station may inform the terminal of transmission information (for example, transmission period, transmission method, etc.) of the overall channel scheduling information message using a broadcasting control message such as a downlink channel descriptor message. Here, the transmission information of the overall channel scheduling information message included in the downlink channel descriptor message can include a start frame offset, a transmission period, an Orthogonal Frequency Division Multiplexing (OFDM) symbol offset, a subchannel offset, a message size, and a transmission characteristic.

Also, the base station may inform the terminal of transmission information (for example, a start frame offset) of an MBS channel scheduling information message using a resource assignment information message such as DL MAP, etc. With this operation, the terminal may receive an MBS channel scheduling information message using the transmission information. The MBS channel scheduling information message informs the terminal, which intends to receive only MBS service of a transmission point, of the next scheduling information so that the terminal can reduce power consumption.

Last, when the transmission period of the MBS channel scheduling information message is long, the base station may inform MBS channel scheduling information of a relevant CID through a DSA procedure with the terminal. Also, when the transmission period of the MBS channel scheduling information message is long, the terminal may obtain scheduling information of a relevant CID using a conventional method. That is, the terminal may determine whether a CID to be received by the terminal is transmitted by analyzing a CID included inside MBS MAP IE( ) or by analyzing an MBS MAP message indicated by MBS MAP IE( ) included in all DL_MAP.

Figure 2:
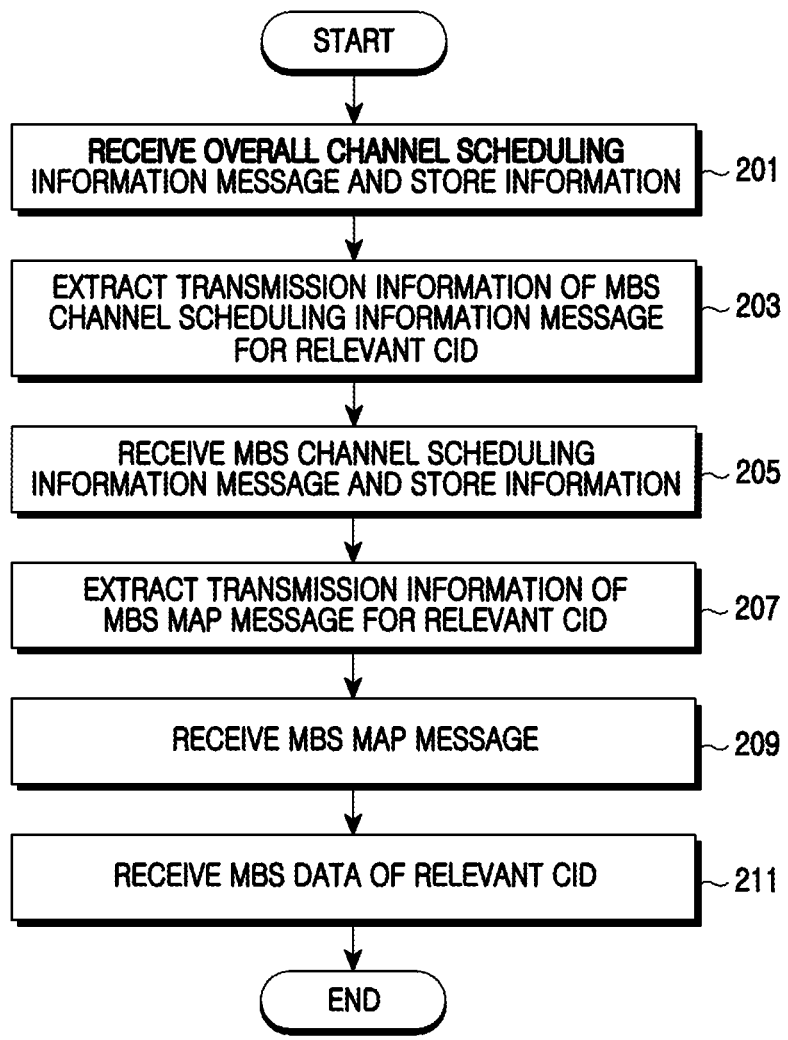
FIG. 2 is a flowchart illustrating a method for receiving MBS data of a terminal in a broadband wireless communication system according to an exemplary embodiment of the present invention.

FIG. 2 is a flowchart illustrating a method for receiving MBS data of a terminal in a broadband wireless communication system according to an exemplary embodiment of the present invention. Here, FIG. 2 illustrates an exemplary method for receiving MBS data using a relevant CID according to channel selection by a user in the method of transmitting scheduling information for each CID group according to a scheduling information transmission period.

Referring to FIG. 2, in step 201, the terminal receives an overall channel scheduling information message from a base station and stores overall channel scheduling information included in the message. In step 203, the terminal extracts transmission information of an MBS channel scheduling information message for a CID of a channel selected by a user from the overall channel scheduling information.

In step 205, the terminal receives an MBS channel scheduling information message from the base station using the extracted transmission information of the MBS channel scheduling information message and stores MBS channel scheduling information included in the message. In step 207, the terminal extracts transmission information of an MBS MAP message for the CID from the MBS channel scheduling information.

In step 209, the terminal receives an MBS MAP message using the extracted transmission information of the MBS MAP message, and in step 211, receives MBS data of the CID using the received MBS MAP message.

After that, the terminal ends the algorithm according to an exemplary embodiment of the present invention.

Figure 3:
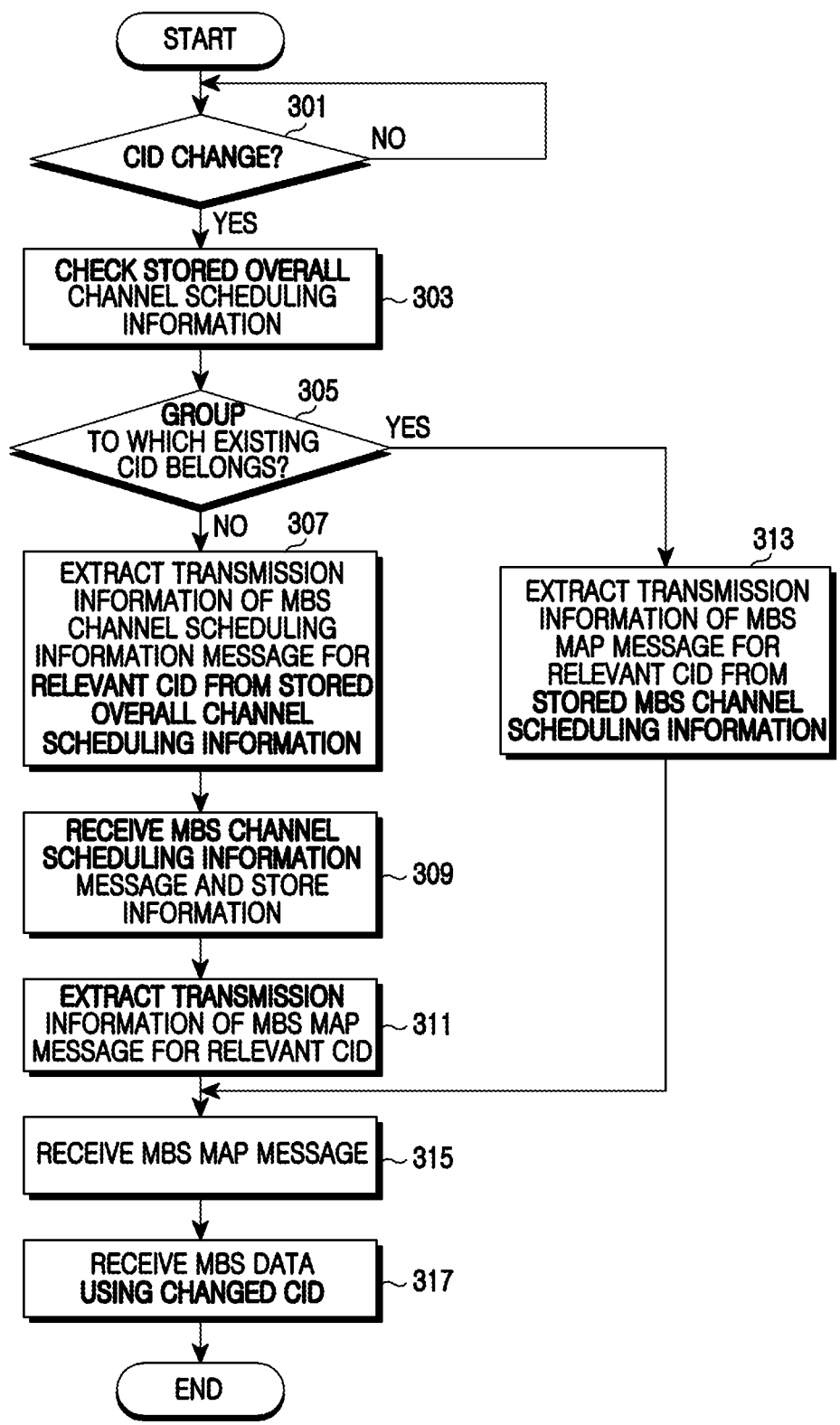
FIG. 3 is a flowchart illustrating a method for changing an MBS channel of a terminal in a broadband wireless communication system according to an exemplary embodiment of the present invention.

FIG. 3 is a flowchart illustrating a method for changing an MBS channel of a terminal in a broadband wireless communication system according to an exemplary embodiment of the present invention. Here, FIG. 3 illustrates an exemplary method for receiving MBS data using a CID that is changed according to a channel change of a user in the method of transmitting scheduling information for each CID group according to a scheduling information transmission period.

Referring to FIG. 3, in step 301, the terminal determines whether a change to a new CID with respect to an existing CID is requested in response to a channel change request of a user. When the CID change request is detected, the terminal checks an overall channel scheduling information stored in advance in step 303. In step 305, the terminal determines whether the new CID belongs to a group to which the existing CID belongs.

When it is determined that the new CID does not belong to the group to which the existing CID belongs in step 305, the terminal extracts transmission information of an MBS channel scheduling information message for the new CID from the overall channel scheduling information stored in advance in step 307. In step 309, the terminal receives an MBS channel scheduling information message from a base station using the extracted transmission information of the MBS channel scheduling information message and stores MBS channel scheduling information included in the message. In step 311, the terminal extracts transmission information of an MBS MAP message for the new CID from the stored MBS channel scheduling information. In step 315, the terminal receives an MBS MAP message using the extracted transmission information of the MBS MAP message, and in step 317, receives MBS data with the new CID changed using the received MBS MAP message.

On the other hand, if it is determined that the new CID is a CID of the same group to which the existing CID belongs in step 305, the terminal extracts transmission information of an MBS MAP message for the new CID from the MBS channel scheduling information stored in advance in step 313, and performs subsequent operations in step 315.

After that, the terminal ends the algorithm according to an exemplary embodiment of the present invention.

Figure 4:
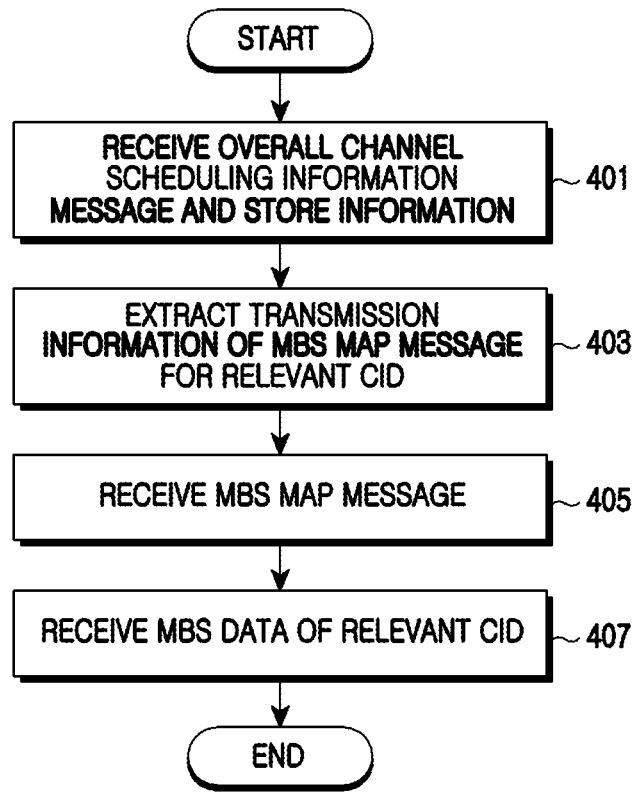
FIG. 4 is a flowchart illustrating a method for receiving MBS data of a terminal in a broadband wireless communication system according to an exemplary embodiment of the present invention.

FIG. 4 is a flowchart illustrating a method for receiving MBS data of a terminal in a broadband wireless communication system according to an exemplary embodiment of the present invention. Here, FIG. 4 illustrates an exemplary method for receiving MBS data using a relevant CID according to channel selection by a user in the method of periodically transmitting scheduling information for all CIDs.

Referring to FIG. 4, in step 401, the terminal receives an overall channel scheduling information message from a base station and stores overall channel scheduling information included in the message. In step 403, the terminal extracts transmission information of an MBS MAP message for a CID of a channel selected by a user from the overall channel scheduling information.

In step 405, the terminal receives an MBS MAP message using the extracted transmission information of the MBS MAP message, and in step 407, receives MBS data of the CID using the received MBS MAP message.

After that, the terminal ends the algorithm according to an exemplary embodiment of the present invention.

Figure 5:
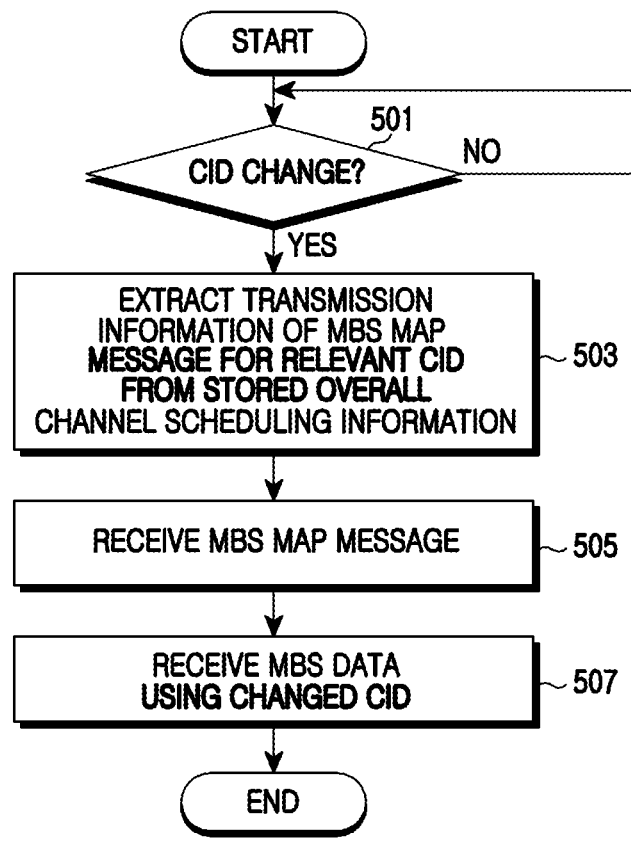
FIG. 5 is a flowchart illustrating a method for changing an MBS channel of a terminal in a broadband wireless communication system according to an exemplary embodiment of the present invention.

FIG. 5 is a flowchart illustrating a method for changing an MBS channel of a terminal in a broadband wireless communication system according to an exemplary embodiment of the present invention. Here, FIG. 5 illustrates an exemplary method for receiving MBS data using a CID changed according to a channel change of a user in the method of periodically transmitting scheduling information for all CIDs.

Referring to FIG. 5, in step 501, a terminal determines whether a change to a new CID is requested with respect to an existing CID according to a channel change request of a user.

When the CID change request is detected, the terminal extracts transmission information of an MBS MAP message for a relevant CID from an overall channel scheduling information stored in advance in step 503, receives the MBS MAP message using the extracted transmission information of the MBS MAP message in step 505, and receives MBS data with a changed new CID using the received MBS MAP message in step 507.

After that, the terminal ends the algorithm according to an exemplary embodiment of the present invention.

Exemplary embodiments of the present invention advantageously simplify an MBS channel change of a terminal while conserving reception coverage of an MBS by transmitting scheduling information for each CID to the terminal through a newly defined message as compared to the conventional DL MAP in a broadband wireless communication system. That is, a terminal according to an exemplary embodiment of the present invention does not need to perform an unnecessary data reception procedure in order to change an MBS channel, and can perform an MBS channel change even when a reception coverage of DL MAP and a reception coverage of an MBS are different from each other.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for receiving a Multicast and Broadcast Service (MBS) channel of a terminal in a wireless communication system, the method comprising:

receiving an overall channel scheduling information message comprising group information for Connection Identifications (CIDs) of all channels in service from a base station;

extracting transmission information of an MBS channel scheduling information message corresponding to a group to which a CID of a current channel belongs from the overall channel scheduling information message;

receiving a relevant MBS channel scheduling information message from the base station using the extracted transmission information of the MBS channel scheduling information message; and extracting transmission information of an MBS MAP message for a relevant CID from the MBS channel scheduling information message, wherein the group information comprises at least one CID group obtained by classifying CIDs of all channels according to a characteristic associated with the corresponding CIDs.

2. The method of claim 1, further comprising:

receiving the MBS MAP message using the extracted transmission information of the MBS MAP message; and receiving MBS data of a relevant CID using the received MBS MAP message.

3. The method of claim 1, wherein the transmission information of the MBS channel scheduling information message included in the overall channel scheduling information message comprises, for each MBS channel scheduling information message, at least one of a start frame offset of a relevant MBS channel scheduling information message, a transmission period of a relevant MBS channel scheduling information message, CIDs included in a relevant MBS channel scheduling information message, a location of a relevant MBS channel scheduling information message inside a relevant frame, and a size of a relevant MBS channel scheduling information message.

4. The method of claim 1, wherein the transmission information of the MBS MAP message included in the MBS channel scheduling information message comprises, for each MBS MAP message, at least one of a start frame offset of a relevant MBS MAP message, a transmission period of a relevant MBS MAP message, a location of a relevant MBS MAP message inside a relevant frame, a size of a relevant MBS MAP message, and CIDs included in a relevant MBS MAP message.

5. The method of claim 1, wherein the transmission information of the MBS MAP message included in the MBS channel scheduling information message comprises, for each CID, at least one of relevant CID information, a start frame offset of an MBS MAP message for a relevant CID, a transmission period of an MBS MAP message for a relevant CID, a location of an MBS MAP message for a relevant CID inside a relevant frame, and a size of an MBS MAP message for a relevant CID.

6. The method of claim 1, wherein the characteristic associated with the corresponding CIDs corresponds to a scheduling information transmission period.

7. The method of claim 1, further comprising:
when a change to a new CID is requested according to a channel change, determining whether the new CID belongs to a group to which an existing CID belongs;
when the new CID belongs to the group to which the existing CID belongs, extracting transmission information of an MBS MAP message for the new CID from the MBS channel scheduling information message; and
when the new CID does not belong to the group to which the existing CID belongs, extracting transmission information of an MBS channel scheduling information message corresponding to a group to which the new CID belongs from the overall channel scheduling information message.

8. The method of claim 1, further comprising receiving transmission information of the overall channel scheduling information message using a broadcasting control message from the base station,
wherein the transmission information of the overall channel scheduling information message comprises at least one of a start frame offset, a transmission period, an Orthogonal Frequency Division Multiplexing (OFDM) symbol offset, a subchannel offset, a message size, and a transmission characteristic.

9. A method for receiving a Multicast and Broadcast Service (MBS) channel of a terminal in a wireless communication system, the method comprising:
receiving a first message which corresponds to an overall channel scheduling information message comprising group information for Connection Identifications (CIDs) of all channels in service from a base station, and transmission information of an MBS MAP message for at least one group of CIDs of all channels in service from a base station;
extracting transmission information of an MBS MAP message corresponding to a group to which a CID of a current channel belongs, from the overall channel scheduling information message; and
receiving a second message which corresponds to the MBS MAP message using the extracted transmission information of the MBS MAP message,
wherein the group information comprises at least one CID group obtained by classifying CIDs of all channels according to a characteristic associated with the corresponding CIDs.

10. The method of claim 9, further comprising:
receiving MBS data of a relevant CID using the received MBS MAP message.

11. The method of claim 9, wherein the transmission information of the MBS MAP message included in the overall channel scheduling information message comprises, for each MBS MAP message, at least one of a start frame offset of a relevant MBS MAP message, a transmission period of a relevant MBS MAP message, a location of a relevant MBS MAP message inside a relevant frame, a size of a relevant MBS MAP message, and CIDs included in a relevant MBS MAP message.

12. The method of claim 9, further comprising, when a change to a new CID is requested according to a channel change, extracting transmission information of an MBS MAP message for the new CID from the overall channel scheduling information message.

13. The method of claim 9, further comprising receiving transmission information of the overall channel scheduling information message using a broadcasting control message from the base station,
wherein the transmission information of the overall channel scheduling information message comprises at least one of a start frame offset, a transmission period, an Orthogonal Frequency Division Multiplexing (OFDM) symbol offset, a subchannel offset, a message size, and a transmission characteristic.

14. An apparatus for receiving a Multicast and Broadcast Service (MBS) channel of a terminal in a wireless communication system, the apparatus comprising:
a receiving unit that is configured to receive an overall channel scheduling information message comprising group information for Connection Identifications (CIDs) of all channels in service from a base station, and to receive a relevant MBS channel scheduling information message from the base station, using extracted transmission information of the MBS channel scheduling information message; and
a processor that is configured to extract transmission information of an MBS channel scheduling information message corresponding to a group to which a CID of a current channel belongs, from the overall channel scheduling information message, and to extract transmission information of an MBS MAP message for a relevant CID from the MBS channel scheduling information message,
wherein the group information comprises at least one CID group obtained by classifying CIDs of all channels according to a characteristic associated with the corresponding CIDs.

15. The apparatus of claim 14,
wherein the receiving unit is further configured to receive the MBS MAP message using the extracted transmission information of the MBS MAP message, and to receive MBS data of a relevant CID using the received MBS MAP message.

16. The apparatus of claim 14, wherein the transmission information of the MBS channel scheduling information message included in the overall channel scheduling information message comprises, for each MBS channel scheduling information message, at least one of a start frame offset of a relevant MBS channel scheduling information message, a transmission period of a relevant MBS channel scheduling information message, CIDs included in a relevant MBS channel scheduling information message, a location of a relevant MBS channel scheduling information message inside a relevant frame, and a size of a relevant MBS channel scheduling information message.

17. The apparatus of claim 14, wherein the transmission information of the MBS MAP message included in the MBS channel scheduling information message comprises, for each MBS MAP message, at least one of a start frame offset of a relevant MBS MAP message, a transmission period of a relevant MBS MAP message, a location of a relevant MBS MAP message inside a relevant frame, a size of a relevant MBS MAP message, and CIDs included in a relevant MBS MAP message.

18. The apparatus of claim 14, wherein the characteristic associated with the corresponding CIDs corresponds to a scheduling information transmission period.

19. The apparatus of claim 14, wherein the processor is further configured to determine, when a change to a new CID is requested according to a channel change, whether the new CID belongs to a group to which an existing CID belongs, to extract, when the new CID belongs to the group to which the existing CID belongs, transmission information of an MBS MAP message for the new CID from the MBS channel scheduling information message, and to extract, when the new CID does not belong to the group to which the existing CID belongs, transmission information of an MBS channel scheduling information message corresponding to a group to which the new CID belongs from the overall channel scheduling information message.

20. The apparatus of claim 14, wherein the receiving unit is further configured to receive transmission information of the overall channel scheduling information message using a broadcasting control message from the base station, and
wherein the transmission information of the overall channel scheduling information message comprises at least one of a start frame offset, a transmission period, an OFDM symbol offset, a subchannel offset, a message size, and a transmission characteristic.

21. An apparatus for receiving a Multicast and Broadcast Service (MBS) channel of a terminal in a wireless communication system, the apparatus comprising:
a receiving unit that is configured to receive a first message which corresponds to an overall channel scheduling information message comprising group information for Connection Identifications (CIDs) of all channels in service from a base station, and transmission information of an MBS MAP message for at least one croup of CIDs of all channels in service from a base station, and to receive a second message which corresponds to a MBS MAP message using extracted transmission information of the MBS MAP message; and
a processor that is configured to extract transmission information of an MBS MAP message corresponding to a group to which a CID of a current channel belongs, from the overall channel scheduling information message,
wherein the group information comprises at least one CID group obtained by classifying CIDs of all channels according to a characteristic associated with the corresponding CIDs.

22. The apparatus of claim 21,
wherein the receiving unit is further configured to receive MBS data of a relevant CID using the received MBS MAP message.

23. The apparatus of claim 21, wherein the transmission information of the MBS MAP message included in the overall channel scheduling information message comprises, for each MBS MAP message, at least one of a start frame offset of a relevant MBS MAP message, a transmission period of a relevant MBS MAP message, a location of a relevant MBS MAP message inside a relevant frame, a size of a relevant MBS MAP message, and CIDs included in a relevant MBS MAP message.

24. The apparatus of claim 21, wherein the processor is further configured to extract, when a change to a new CID is requested according to a channel change, transmission information of an MBS MAP message for the new CID from the overall channel scheduling information message.

25. The apparatus of claim 21, wherein the receiving unit is further configured to receive transmission information of the overall channel scheduling information message using a broadcasting control message from the base station, and
wherein the transmission information of the overall channel scheduling information message comprises at least one of a start frame offset, a transmission period, an Orthogonal Frequency Division Multiplexing (OFDM) symbol offset, a subchannel offset, a message size, and a transmission characteristic.

26. A method for receiving a Multicast and Broadcast Service (MBS) channel of a terminal in a wireless communication system, the method comprising:
receiving an overall channel scheduling information message comprising group information for Connection Identifications (CIDs) of all channels in service from a base station;
extracting transmission information of an MBS channel scheduling information message corresponding to a group to which a CID of a current channel belongs from the overall channel scheduling information message;
receiving a relevant MBS channel scheduling information message from the base station using the extracted transmission information of the MBS channel scheduling information message;
extracting transmission information of an MBS MAP message for a relevant CID from the MBS channel scheduling information message; and
when a change to a new CID is requested according to a channel change, determining whether the new CID belongs to a group to which an existing CID belongs.

27. The method of claim 26, further comprising:
when the new CID belongs to the group to which the existing CID belongs, extracting transmission information of an MBS MAP message for the new CID from the MBS channel scheduling information message; and
when the new CID does not belong to the group to which the existing CID belongs, extracting transmission information of an MBS channel scheduling information message corresponding to a group to which the new CID belongs from the overall channel scheduling information message.

28. An apparatus for receiving a Multicast and Broadcast Service (MBS) channel of a terminal in a wireless communication system, the apparatus comprising:
a receiving unit that is configured to receive an overall channel scheduling information message comprising group information for Connection Identifications (CIDs) of all channels in service from a base station, and to receive a relevant MBS channel scheduling information message from the base station using the extracted transmission information of the MBS channel scheduling information message; and
a processor that is configured to extract transmission information of an MBS channel scheduling information message corresponding to a group to which a CID of a current channel belongs from the overall channel scheduling information message, to extract transmission information of an MBS MAP message for a relevant CID from the MBS channel scheduling information message, to determine, when a change to a new CID is requested according to a channel change, whether the new CID belongs to a group to which an existing CID belongs, to extract, when the new CID belongs to the group to which the existing CID belongs, transmission information of an MBS MAP message for the new CID from the MBS channel scheduling information message, and to extract, when the new CID does not belong to the group to which the existing CID belongs, transmission information of an MBS channel scheduling information message corresponding to a group to which the new CID belongs from the overall channel scheduling information message.

* * * * *